(12) United States Patent
Brail

(10) Patent No.: US 8,554,846 B2
(45) Date of Patent: Oct. 8, 2013

(54) SYSTEM AND METHOD FOR PROVIDING A MESSAGING KERNEL

(75) Inventor: Gregory Brail, Montclair, NJ (US)

(73) Assignee: Oracle International Corporation, Redwood Shores, CA (US)

(*) Notice: Subject to any disclaimer, the term of this patent is extended or adjusted under 35 U.S.C. 154(b) by 1336 days.

(21) Appl. No.: 11/441,726

(22) Filed: May 26, 2006

(65) Prior Publication Data

US 2007/0073821 A1 Mar. 29, 2007

Related U.S. Application Data

(60) Provisional application No. 60/721,146, filed on Sep. 27, 2005.

(51) Int. Cl.
*G06F 15/16* (2006.01)

(52) U.S. Cl.
USPC .................... 709/206; 709/226; 709/207

(58) Field of Classification Search
USPC ............................ 709/207, 206, 226
See application file for complete search history.

(56) References Cited

U.S. PATENT DOCUMENTS

| | | | | |
|---|---|---|---|---|
| 5,983,265 A * | 11/1999 | Martino, II | .......... | 709/206 |
| 6,058,389 A * | 5/2000 | Chandra et al. | .......... | 707/1 |
| 6,510,429 B1 * | 1/2003 | Todd | .......... | 705/36 R |
| 7,181,489 B2 * | 2/2007 | Lection et al. | .......... | 709/202 |
| 7,421,501 B2 * | 9/2008 | Critchley et al. | .......... | 709/227 |
| 2003/0110230 A1 * | 6/2003 | Holdsworth et al. | .......... | 709/207 |
| 2004/0139166 A1 * | 7/2004 | Collison | .......... | 709/207 |
| 2004/0240458 A1 * | 12/2004 | T V et al. | .......... | 370/412 |
| 2004/0264241 A1 * | 12/2004 | Todd | .......... | 365/158 |
| 2005/0078605 A1 * | 4/2005 | Huang et al. | .......... | 370/235 |
| 2005/0080819 A1 * | 4/2005 | Russell | .......... | 707/104.1 |
| 2005/0246186 A1 * | 11/2005 | Nikolov | .......... | 705/1 |
| 2006/0294333 A1 * | 12/2006 | Michaylov et al. | .......... | 711/168 |

* cited by examiner

*Primary Examiner* — Thai Nguyen
(74) *Attorney, Agent, or Firm* — Fliesler Meyer LLP

(57) ABSTRACT

The present invention enables a messaging kernel to serve as the basis for asynchronous messaging in a Web service platform. The kernel provides basic messaging features, including point-to-point and publish/subscribe messaging, persistent and non-persistent messages, a variety of acknowledgement modes, two-phase commit transactions, quotas, statistics, message sorting, and message paging. It also includes some novel features that maintain message order based on application requirements. This description is not intended to be a complete description of, or limit the scope of, the invention. Other features, aspects, and objects of the invention can be obtained from a review of the specification, the figures, and the claims.

17 Claims, 2 Drawing Sheets

SYSTEM AND METHOD FOR PROVIDING A MESSAGING KERNEL

CLAIM OF PRIORITY

This application claims benefit from U.S. Provisional Patent Application No. 60/721,146, filed Sep. 27, 2005, entitled "Messaging Kernel" by Gregory Brail.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of asynchronous messaging management.

BACKGROUND

A messaging service, for a non-limiting example, a Java® Message Service (JMS), is an application program interface (API) that supports the formal communication known as messaging between computers (servers) within a cluster in a network (a standalone server is considered as a cluster with one server). Here, messaging is the creation, storage, exchange, and management of messages between producers who send/publish the messages to a destination and consumers who receive, subscribe, and browse the messages from the destination. Here, a message can be but is not limited to, text, image, voice, telex, fax, e-mail, paging, and other suitable electronic data describing events, requests, and replies over a communication network.

Asynchronous messaging is a key part of modern enterprise transaction processing. It has become even more important in recent years with the rise of e-commerce and web services. In order to remain competitive, an application server built for today's market must include a messaging component that supports multiple standards, provides a variety of advanced features, and at the same time remains reliable, available, secure, and performant.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable a messaging kernel to serve as the basis for asynchronous messaging in a Web service platform. The kernel provides basic messaging features, including point-to-point and publish/subscribe messaging, persistent and non-persistent messages, a variety of acknowledgement modes, two-phase commit transactions, quotas, statistics, message sorting, and message paging. It also includes some novel features that maintain message order based on application requirements. The messaging kernel can be used as the foundation of higher-level message-oriented middleware systems, which can be but are not limited to, JMS and Web Services Reliable Messaging (WS-RM) implementations in the Web service platform for reliable web services messaging.

Figure 1:
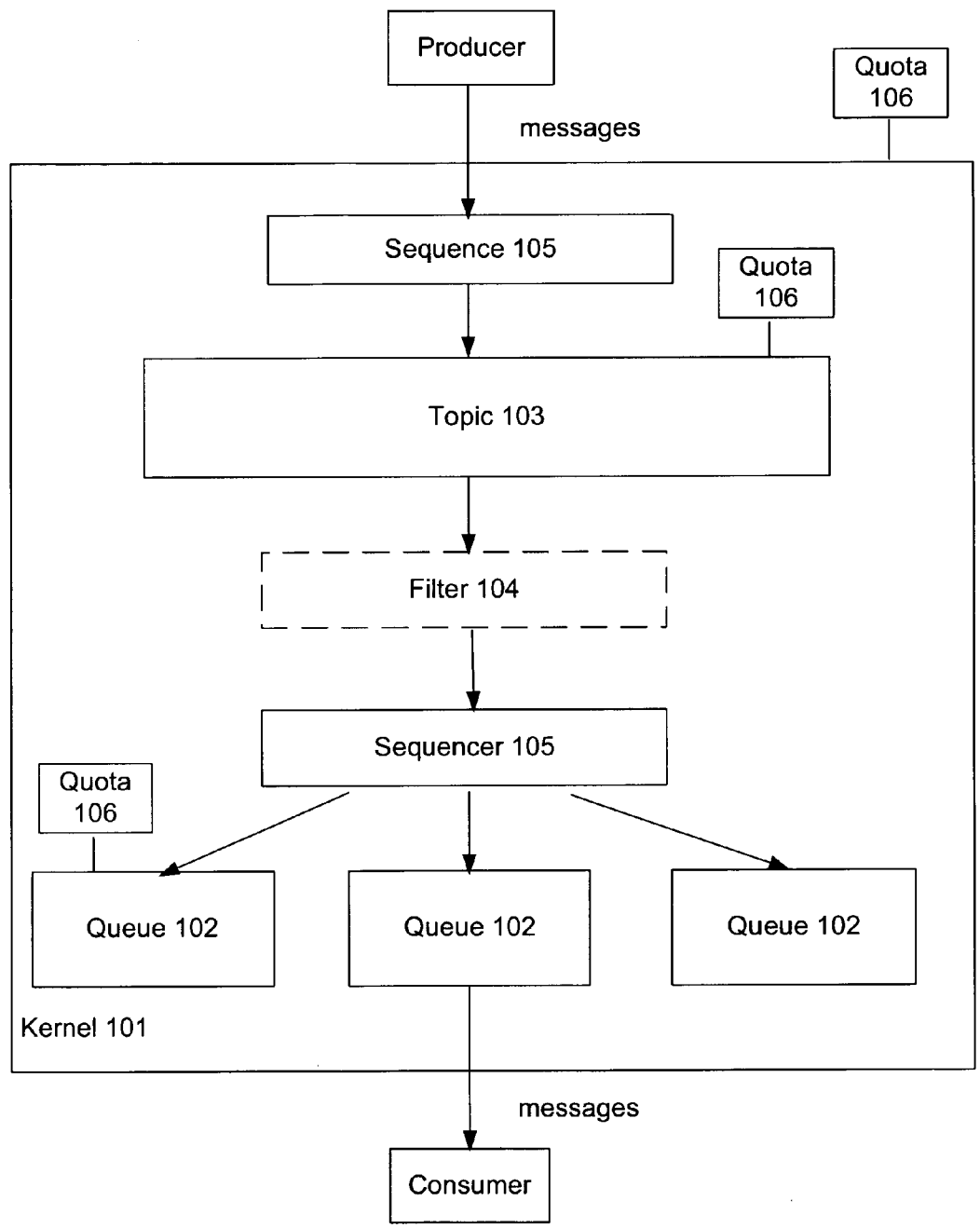
FIG. 1 is an illustration of an exemplary system for messaging kernel in one embodiment of the present invention.

FIG. 1 is an illustration of an exemplary system for messaging kernel in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, kernel 101 is the central structure that holds the messaging kernel system together. It is basically the container for the other objects, including queues, topics, and sequencers. The kernel maintains a number of global-level objects and configuration parameters for features such as paging, persistence, and statistics. Queue 102 is the most important structure in the kernel. It is intended to map one-to-one with the concept of a "queue" in JMS, but it may be used for other purposes as well. Producers of messages can put messages on a queue, and they are delivered to consumers of the messages. There can be a plurality of queues in the kernel, each queue can support any number of concurrent producers and consumers. Messages are normally delivered in "weak FIFO (First In First Out)" ordering, but additional ordering and sequencing guarantees can optionally be applied, as well as message sorting criteria. Topic 103 is a mechanism for multicasting a message to multiple queues. When a producer sends a message to a topic, a copy of the message is placed on each queue that has subscribed to a topic. Once the message send is complete, the messages on each queue operate independently, just like messages on individual queues. An optional filter 104 can be attached to a topic, which determines which queues receive messages, and may examine the content of each message in order to make this determination. Filters are pluggable, and are implemented by the user of the kernel. This is due in part to the fact that the kernel is agnostic of the format of the message itself. Sequencer 105 is an additional data structure that may be used to order messages as they are placed on a queue and/or topic. There are several different types of sequencers, each is persistent and associated with a pair of sequence numbers. A quota object 106 may be attached to a queue, topic, or kernel. When a quota is in use, each new message increments the message count and byte count on the quota, and the counts are decremented as messages are removed. When a quota's limit has been reached, an error is produced when a new message is sent. If a queue or a topic has an associated quota, then the quota is used when new messages are sent. If a queue or topic has no quota, then the kernel's quota, if any, is used.

Figure 2:
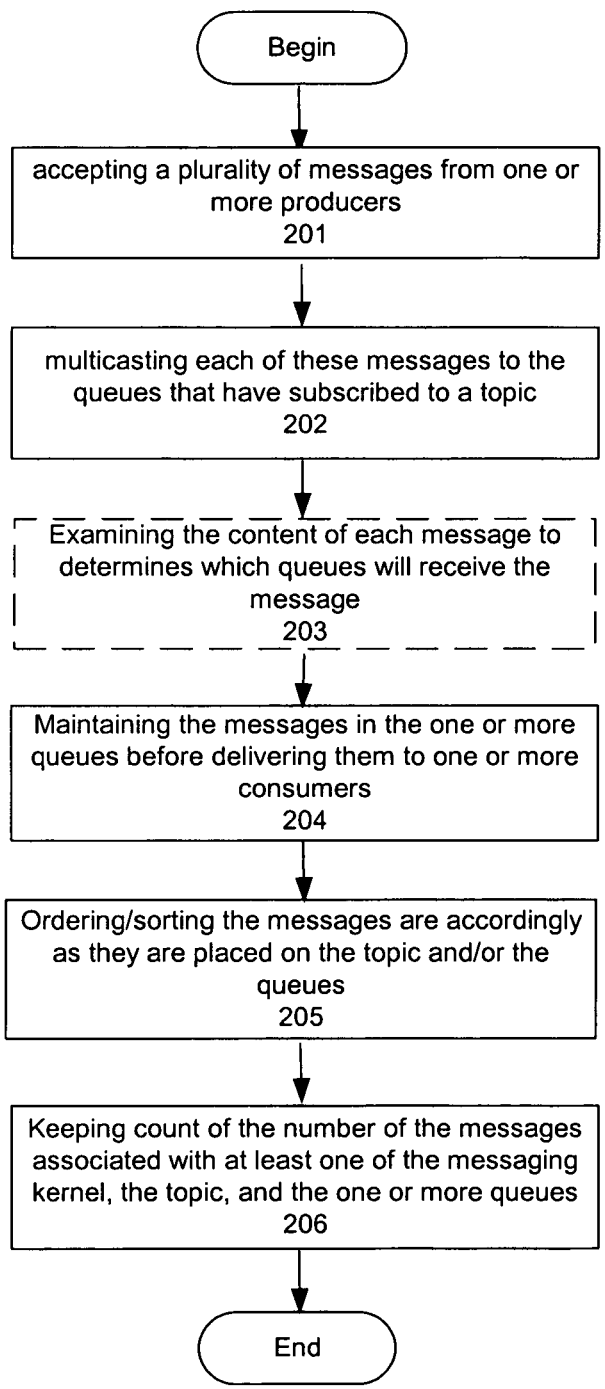
FIG. 2 is a flow chart illustrating an exemplary process for messaging kernel in accordance with one embodiment of the invention.

FIG. 2 is a flow chart illustrating an exemplary process for messaging kernel in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, the topic inside the kernel accepts a plurality of messages from one or more producers at step 201 and multicasting each of these messages to the queues that have subscribed to the topic at step 202. The content of each message can be examined optionally by a filter attached to the topic at step 203 to determines which queues will receive the message. Once delivered, the messages are maintained in the one or more queues before they are delivered to one or more consumers at step 204. The messages are ordered/sorted accordingly as they are placed on the topic and/or the queues at step 205, and a quota object can keep count of the number of the messages associated with at least one of the messaging kernel, the topic, and the one or more queues at step 206.

In some embodiments, the messaging kernel is designed to be agnostic of the JMS and J2EE specifications. For these reasons, it does not use the JMS API, but instead uses its own, simplified API that does not reference any J2EE APIs. The kernel is also agnostic of the format of the messages that are used with it. Messages used with the kernel must implement the few methods on the "Message" interface, but this interface allows for a variety of messages, as it essentially treats each message as a generic object.

In some embodiments, queues support message-oriented middleware APIs such as JMS with sufficient semantics, including various options for message acknowledgement, configurable sort order, pluggable filters to allow consumers to select which messages they receive, and cursors for non-destructive viewing and manipulation of messages.

In some embodiments, a queue contains a single double-linked list of messages, wherein each message contains a number of flags. The most important flag is the "state" flag, which is a bit mask. A "state" of zero indicates that a message is "visible," which means that it is eligible for consumption. There can be a number of state flags, each represented by a single bit on the "state" field of the message.

In some embodiments, all messages remain on the main message list. When a consumer needs to receive a message, it scans the queue for messages with a "state" of zero, which makes the main implementation of the queue fairly simple.

In some embodiments, an additional message list is used to hold invisible messages. As messages are made invisible in these cases, they are moved to this second list and removed from the main list and they are replaced if they become visible again. This optimization is used in common cases, such as the case of a message that has been received and is awaiting acknowledgement, because it means consumers have fewer messages to check when scanning the main list for the next visible message.

In some embodiments, a producer sends a message to a queue by retrieving the appropriate queue object from a kernel, and calls the "send" method that executes the following steps:

1. Check various management parameters, such as whether the queue is not currently accepting messages (an administrative setting can be used to enable this behavior).
2. Allocate quota for the new message. If quota cannot be granted, return an error and do not continue.
3. Calculate the time that the message may expire if expiration is enabled, or schedule the message for future delivery if that option was selected.
4. Add the message to the message list and update the statistics for the queue and for the kernel.
5. If the message is persistent, write the message to the persistent store.
6. If the message is already "visible", then determine if there is a consumer waiting for the message by checking the reader list (described in the next section). If a consumer is available, give the message to the consumer and mark the message as "pending".

Note that in step 6, the message is only considered to be "visible" and is given to a consumer during the "send" operation if the message's delivery time has been reached (since messages may be scheduled for future delivery).

If the message is not given to a consumer during the "send" operation, then it remains on the message list, with the appropriate message state bits set. When all the state bits have been cleared and the message is considered "visible," the list of waiting consumers is checked and the message is delivered to the first matching consumer, if any.

In some embodiments, there can be several optimizations of the method. For a non-limiting example, if the message is non-persistent, and the consumer promises that it will never "negatively acknowledge" the message, then several steps can be skipped if the message can be given to a waiting consumer during the "send" operation. For another non-limiting example, certain statistics need not be incremented and immediately decremented, and the message need never be actually placed on the queue's message list. In effect, the message never really "lands" on the queue. This optimization greatly increases performance when a queue is used as part of a "non-durable" JMS topic subscription, which does not require that messages remain available after a server crash or client disconnect.

In some embodiments, consumers can read messages from queues using a reader. A reader attaches to a queue, and maintains a value called its "count." When a reader is first created, it scans the queue for visible messages. If the reader's "count" is greater than 1, then it may retrieve multiple messages from the queue. If a number of messages equal to the reader's "count" is retrieved, then the reader processes the messages and it is finished. If, however, fewer than "count" messages are retrieved, then the reader is placed on the queue's reader list. This is the list that is checked each time a new message becomes visible on the queue. Once the "count" has been satisfied, the user of the reader will not receive any more messages until it chooses to increment the "count." When this happens, the value is incremented, and the reader again scans the queue for visible messages. Once a message has been received from a queue, its "RECEIVED" bit is set, which makes the message invisible to other consumers.

In some embodiments, topics allow multicasting to a group of subscribers, with pluggable filters to choose which subscribers receive each new message. When a message is sent to a topic, the topic's filter is checked against the message. Filters are normally implemented by users of the kernel, such as JMS. They may compare various fields in the message with a selection language such as SQL to determine which queues should receive the new message. Once the filter has determined which messages receive the message, a copy of the message is placed on each queue. Sending to each queue proceeds largely as though a separate message is sent to each queue, although some optimizations can be used.

In some embodiments, a reference count is used, so that only one copy of the message itself is maintained, and multiple copies of the associated state are kept, and point to the single message copy. In addition, persistent messages are stored in a different format when sent to a topic. One persistent object holds the message itself, and is only removed when the message is acknowledged by all consumers. Other persistent objects record which queues hold a copy of the message. In this case, queues are grouped, so that one object represents a number of queues. This object is updated each time a message is acknowledged on a queue, and removed entirely when all queues have acknowledged the messages. Such implementation was chosen because when a single object was used to keep track of all the queues that held the message, there was too much contention on this single object. On the other hand, when a separate persistent object was used to represent each queue, the large number of persistent objects slowed performance when a message was sent to thousands of queues simultaneously.

In some embodiments, a cursor can be used to scan a queue without necessarily removing messages. Cursors may be created with optional filters to control which messages are shown. They may also choose which message states to accept. A typical JMS cursor, for instance, only shows visible messages, but in certain situations an administrator may wish to see invisible messages, or only messages in a particular state. The cursor implements this by scanning the main queue list in order (and bi-directionally if desired), and ignoring any messages that do not meet the specified state.

In some embodiments, cursors in the kernel are always snapshots of the state of the queue when the cursor was created. When a cursor is created, a new message list is created containing all the messages on the queue that match the filter criteria. The message list uses the same reference-counting mechanism used for topics, so that only one copy of each message is maintained in memory.

In some embodiments, the consumer provides three separate ways of tracking and monitoring its performance—statistics, thresholds, and quotas in order to preserve the high level of "manageability" required by today's enterprise customers. Comprehensive statistics allows for management visibility into the state of the server, while quotas and thresholds allow control of the number of messages in the server and prevent overload.

In some embodiments, each queue, topic, and kernel can maintain a set of statistics, which include, but are not limited to, a "current" count, showing the total number of messages "inside" the queue, topic, or kernel, and a "pending" count, showing only the number of messages that are not visible. There is also a count of the total number of messages received. For all three counts, the kernel keeps track of the number of messages, and the cumulative number of bytes in those messages.

Statistics are inherited, so that when a statistic is updated on a queue, the update is propagated to the topic the queue is subscribed to (if any), and then to the kernel itself. For performance reasons, statistics are deliberately not kept transactionally consistent. Instead, each statistics update is performed using an atomic test-and-set operation if possible on the platform, so that no locking is required.

In some embodiments, quotas, on the other hand, are deliberately kept consistent, so more locking is required. Each queue may be associated with at most one quota—either its own quota, a topic's quota, or the kernel's quota. Quotas keep track of a message count and a byte count, and when either is exceeded, the queue or topic will reject any new messages.

In some embodiments, thresholds are associated with quotas. Multiple thresholds may be set on each quota. If a threshold is set, then the quota's "messages" and "bytes" values are checked against all the quotas. Each quota has a "low" and a "high" value for each. When the "high" value is reached, the quota is activated, and the threshold's listener is notified. The threshold is cleared only when it crosses below the "low" value, and at that point, the listener is notified again.

In some embodiments, persistence is used so that queue and topic messages can survive a server crash. The kernel can implement persistence using a persistent store, which supports high-throughput, transactional object persistent either in a file system or in a database, to maintain the following persistent objects:

Destinations: one object is persisted for each queue and topic to record the name and other global information.

Messages: one object is persisted for each message. It is removed when the message is acknowledged by all queues that contain it.

Queue records: when a message is sent to a single queue, an object records this relationship. It is removed when the message is acknowledged.

Multi-Subscriber records: when a message is sent to a topic, subscriber records are used to record which queues have not yet acknowledged the message.

In some embodiments, transaction support can be utilized so that sending and receiving of messages may be associated with one- or two-phase commit transactions:

Two-phase commit records: when a message is sent or acknowledged as part of a two-phase commit transaction, a two-phase commit record is written to the store during the "prepare" phase. The record is removed when the transaction commits or rolls back.

Sequence records: one record is stored for each sequencer. It is updated each time either of the stored sequence numbers changes.

In some embodiments, the kernel allows messages to be cleared from memory and written to hard disk when the amount of data stored in memory reaches a threshold in order to control memory usage. This mechanism is called paging. The kernel maintains a count of the total number of bytes used by messages in memory. It also maintains a list of messages in memory, in LIFO (last in, first out) order. Each time a message body is referenced inside the kernel, it is "pinned." This decrements the paging counter and removes the message from the list. When the message is later un-pinned, the counter is incremented and the message is placed at the end of the list. As messages are un-pinned, if the paging counter crosses the paging threshold, messages are asynchronously written to the disk, and their references are dropped from memory so that they are eligible for garbage collection. Later, when a message is re-pinned, it will be read from disk if necessary.

In some embodiments, messages are never placed on the disk if the number of bytes eligible for paging is less than one-quarter of the threshold for further performance optimization. This allows optimization for the common case by avoiding the lock on the paging list, because all that is required in this case is an increment of an atomic integer, which requires no lock.

In some embodiments, unit of order can be used to control concurrency when multiple threads are used to receive messages from a single queue. The unit of order feature provides additional control for the delivery of messages to consumers by associating each message with an optional "group." When a message is delivered to a consumer, and it has a "group" set, then that group is attached to the consumer. Once this happens, no additional messages may be delivered from the same group to a different consumer. The queue implements this by maintaining a separate list for each message group, and by setting the "ORDERED" flag on the next message of each group. When the message is acknowledged or negatively acknowledged, the ORDERED flag is cleared and the next message in the group is made available for delivery.

In some embodiments, sequencing can be used to support higher-level network protocols that require duplicate elimination and message ordering based on sequence numbers. It provides a number of features that can be used to control the order in which messages are placed on the queue (It is therefore different from unit of order, which controls the order in which messages are consumed). There are three sequence modes supported:

The "ASSIGN" sequence mode can be used to assign sequence numbers to messages as they are placed on the queue.

The "ELIMINATE_DUPLICATES" sequencing mode can be used to implement application protocols that require duplicate elimination.

The "REORDER" sequencing mode can be used to implement protocols that deliver messages out of order.

In some embodiments, sequencing modes can be combined. For a non-limiting example, if "ASSIGN" and "REORDER" are set, then the kernel will re-order messages arriving on the queue, and then (and only then) assign new sequence numbers. This feature may be used in systems that need to implement multi-stage message pipelines.

In some embodiments, JMS (Java Message Service) implementation can be based on the messaging kernel. When messages are received asynchronously using the JMS "MessageListener" interface, a single kernel "reader" is created for each JMS "Consumer." The "count" feature of the kernel's reader is used to limit the "window size" of messages exposed to the consumer, which is tunable by the user. As messages are acknowledged, the count is incremented. When messages are received synchronously using the JMS "receive" method, a kernel "reader" is created for each "receive" call with a count of zero. A timer is set on the kernel reader so that it unregisters automatically when the receive timeout has been reached.

In some embodiments, the various JMS acknowledgement modes are implemented by calling the "acknowledge" and "negativeAcknowledge" methods as called for by the JMS specification. JMS topics can be implemented as messaging kernel topics. A custom topic filter was implemented, which uses the standard JMS SQL syntax to compare each message and come up with an appropriate list of subscribers.

In some embodiments, each JMS topic subscriber is implemented as a kernel queue. Durable subscribers are implemented as queues that support persistent messages, while non-durable subscribers use non-durable queues, which will not persist the message. In addition, the special "auto-acknowledge" optimization of the kernel queue is used, because non-durable topic subscriber messages in JMS will never be returned to the JMS consumer once delivered.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "kernel" is used in the embodiments of the systems and methods described above, it will be evident that such concept can be interchangeably used with equivalent concepts such as, method, type, interface, bean, component, object model, and other suitable concepts. While the concept "interface" is used in the embodiments of the systems and methods described above, it will be evident that such concept can be interchangeably used with equivalent concepts such as, bean, class, method, type, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide a messaging kernel, comprising:
a server running on one or more processors;
one or more topics, each of said one or more topic operable to accept a plurality of messages from one or more producers;
a plurality of queues subscribed to at least one of said one or more topic, wherein each of said plurality of queues operable to deliver one or more messages of the plurality of messages to one or more consumers, wherein the one or more topic operable to multicast the plurality of messages to each queue of the plurality of queues;
a reference counter, residing on the server, that maintains a reference count that indicates a total number of times that a message of the plurality of messages is referenced by the plurality of queues, wherein the reference count is reduced by one whenever a reference to the message is removed, wherein only one copy of the message is stored in the messaging kernel, and the copy of the message is removed when the reference count is reduced to zero;
a cursor to support non-destructive viewing and manipulation of the one or more messages of the plurality of messages in a particular queue of the plurality of queues, wherein the cursor uses a filter to scan the one or more messages of the plurality of messages in the particular queue, and wherein the cursor uses a message list to provide a snapshot to a state of the particular queue, wherein the message list contains messages that match one or more criteria specified in the filter that is associated with the cursor.

2. The system according to claim 1, wherein:
each of the plurality of messages is one of a text, an image, a voice, a telex, a fax, an e-mail, a paging, and an electronic data describing events, requests, and replies over a communication network.

3. The system according to claim 1, wherein:
each said queue contains one or more messages in a single double-linked list and is operable to maintain status of each said one or more messages in the queue.

4. The system according to claim 1, wherein:
the messaging kernel is operable to support a message service.

5. The system according to claim 1, wherein:
the messaging kernel is operable to support asynchronous messaging in a web service platform.

6. The system according to claim 1, wherein:
the messaging kernel is operable to provide a plurality of parameters for status of at least one of the kernel, the one or more topics and the one or more queues.

7. The system according to claim 6, wherein:
the messaging kernel is operable to provide a plurality of interfaces to support a plurality of operations on the plurality of messages and/or the plurality of parameters by the one or more consumers and/or producers.

8. The system according to claim 1, wherein:
the messaging kernel is operable to persist each of the plurality of messages in the one or more topics and/or the one or more queues via a persistent store.

9. The system according to claim 1, wherein:
the messaging kernel is operable to store data to a hard disk when the amount of data stored in memory reaches a threshold via paging.

10. The system according to claim 1, wherein:
the messaging kernel is operable to support one-phase and/or two-phase commit transactions when sending and receiving the plurality of messages.

11. The system according to claim 1, wherein:
the messaging kernel is operable to control concurrency when multiple threads are used to receive messages from one of the one or more queues via unit-of-order.

12. The system according to claim 1, wherein:
the messaging kernel is operable to provide sequencing support for higher-level network protocols that require duplicate elimination and message ordering based on sequence numbers.

13. The system according to claim 1, wherein:
the performance of the messaging kernel is measured by at least one of: statistics, thresholds, and quotas of the system.

14. The system according to claim 1, further comprising:
a filter that is attached with the at least one topic, wherein the filter examines content of each message received at the at least one topic and determines the one or more messages that each said queue receives.

15. The system according to claim 1, wherein:
the reference count further indicates a total number of times that a message is referenced by the message list associated with the cursor, in addition to the total number of times that said message is referenced by the plurality of queues.

16. A method to provide a messaging kernel, comprising:
accepting a plurality of messages from one or more producers via one or more topics;
multicasting the plurality of messages to a plurality of queues subscribed to at least one of said one or more topic;
delivering one or more messages of the plurality of messages in the plurality of queues to one or more consumers;
using a reference counter, residing on a server, that maintains a reference count that indicates a total number of times that a message of the plurality of messages is referenced by the plurality of queues, wherein the reference count is reduced by one whenever a reference to the message is removed, wherein only one copy of the message is stored in the messaging kernel, and the copy of the message is removed when the reference count is reduced to zero; and
using a cursor to support non-destructive viewing and manipulation of the one or more messages of the plurality of messages in a particular queue of the plurality of queues, wherein the cursor uses a filter to scan the one or more messages of the plurality of messages in the particular queue, and wherein the cursor uses a message list to provide a snapshot to a state of the particular queue, wherein the message list contains messages that match one or more criteria specified in the filter that is associated with the cursor.

17. A non-transitory machine readable medium having instructions stored thereon that when executed cause a system to:
accept a plurality of messages from one or more producers via one or more topics;
multicast the plurality of messages to a plurality of queues subscribed to at least one of said one or more topic;
deliver one or more messages of the plurality of messages in the plurality of queues to one or more consumers;
use a reference counter, residing on a server, that maintains a reference count that indicates a total number of times that a message of the plurality of messages is referenced by the plurality of queues, wherein the reference count is reduced by one whenever a reference to the message is removed, wherein only one copy of the message is stored in a messaging kernel, and the copy of the message is removed when the reference count is reduced to zero; and
use a cursor to support non-destructive viewing and manipulation of the one or more messages of the plurality of messages in a particular queue of the plurality of queues, wherein the cursor uses a filter to scan the one or more messages of the plurality of messages in the particular queue, and wherein the cursor uses a message list to provide a snapshot to a state of the particular queue, wherein the message list contains messages that match one or more criteria specified in the filter that is associated with the cursor.

\* \* \* \* \*